(12) United States Patent
Fukasawa

(10) Patent No.: US 9,137,402 B2
(45) Date of Patent: Sep. 15, 2015

(54) DISPLAYING AN OPERATIONAL SCREEN OF AN IMAGE FORMING APPARATUS ON A DISPLAY SCREEN OF A CLIENT DEVICE IN ORDER TO CONTROL THE IMAGE FORMING APPARATUS FROM THE CLIENT DEVICE

(75) Inventor: Yusuke Fukasawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 13/587,064

(22) Filed: Aug. 16, 2012

(65) Prior Publication Data
US 2013/0208306 A1 Aug. 15, 2013

(30) Foreign Application Priority Data
Aug. 22, 2011 (JP) .................................. 2011-180413

(51) Int. Cl.
*G06F 3/14* (2006.01)
*H04N 1/00* (2006.01)
*G06F 3/12* (2006.01)

(52) U.S. Cl.
CPC .......... *H04N 1/00501* (2013.01); *G06F 3/1205* (2013.01); *G06F 3/1232* (2013.01); *G06F 3/1253* (2013.01); *G06F 3/1285* (2013.01); *H04N 1/00222* (2013.01); *H04N 2201/0075* (2013.01); *H04N 2201/0094* (2013.01)

(58) Field of Classification Search
CPC ........ G06F 3/14; G06F 3/1454; G06F 9/4445
USPC ....................................................... 358/1.15
See application file for complete search history.

(56) References Cited

U.S. PATENT DOCUMENTS 7,576,877 B2 * 8/2009 Tanaka et al. ................ 358/1.14
2003/0211865 A1 * 11/2003 Azami et al. .................. 455/557
(Continued)

FOREIGN PATENT DOCUMENTS

CN 1893529 A 1/2007
JP 2004-235962 A 8/2004
(Continued)

OTHER PUBLICATIONS

Chinese Office Action issued in corresponding application No. 201210294526.6 on Aug. 22, 2014.

*Primary Examiner* — Eric A Rust
(74) *Attorney, Agent, or Firm* — Carter, DeLuca, Farrell & Schmidt, LLP

(57) ABSTRACT

An information processing apparatus which is capable of, whenever a new image processing apparatus is put on sale, remotely controlling the image processing apparatus without performing maintenance on the information processing apparatus. A display unit displays a first screen corresponding to an operation screen displayed on at least one image processing apparatus and a second screen corresponding to the hardware key which the at least image processing apparatus has. A holding unit holds a plurality of image of hardware keys corresponding to the hardware key which the at least image processing apparatus has. A display control unit selects an image of a hardware key corresponding to a hardware key which an image processing apparatus performing communication via a communication unit has from among at least one image of a hardware key held in the holding unit, and displays the second screen using the selected image of the hardware key.

13 Claims, 7 Drawing Sheets

(56) References Cited

U.S. PATENT DOCUMENTS

| | | | |
|---|---|---|---|
| 2009/0021761 A1* | 1/2009 | Suzuki et al. | 358/1.13 |
| 2009/0051981 A1* | 2/2009 | Kuboki | 358/474 |
| 2009/0116051 A1* | 5/2009 | Kasai | 358/1.13 |
| 2009/0237728 A1* | 9/2009 | Yamamoto | 358/1.15 |
| 2010/0014112 A1* | 1/2010 | Yoshida | 358/1.15 |
| 2010/0241982 A1* | 9/2010 | Motosugi et al. | 715/771 |
| 2013/0155452 A1* | 6/2013 | Koizumi | 358/1.15 |

FOREIGN PATENT DOCUMENTS

| | | |
|---|---|---|
| JP | 2005-313413 A | 11/2005 |
| JP | 2008-071313 A | 3/2008 |
| JP | 2010-224763 A | 10/2010 |
| JP | 2011-139312 A | 7/2011 |
| KR | 10-0739795 B1 | 7/2007 |

\* cited by examiner

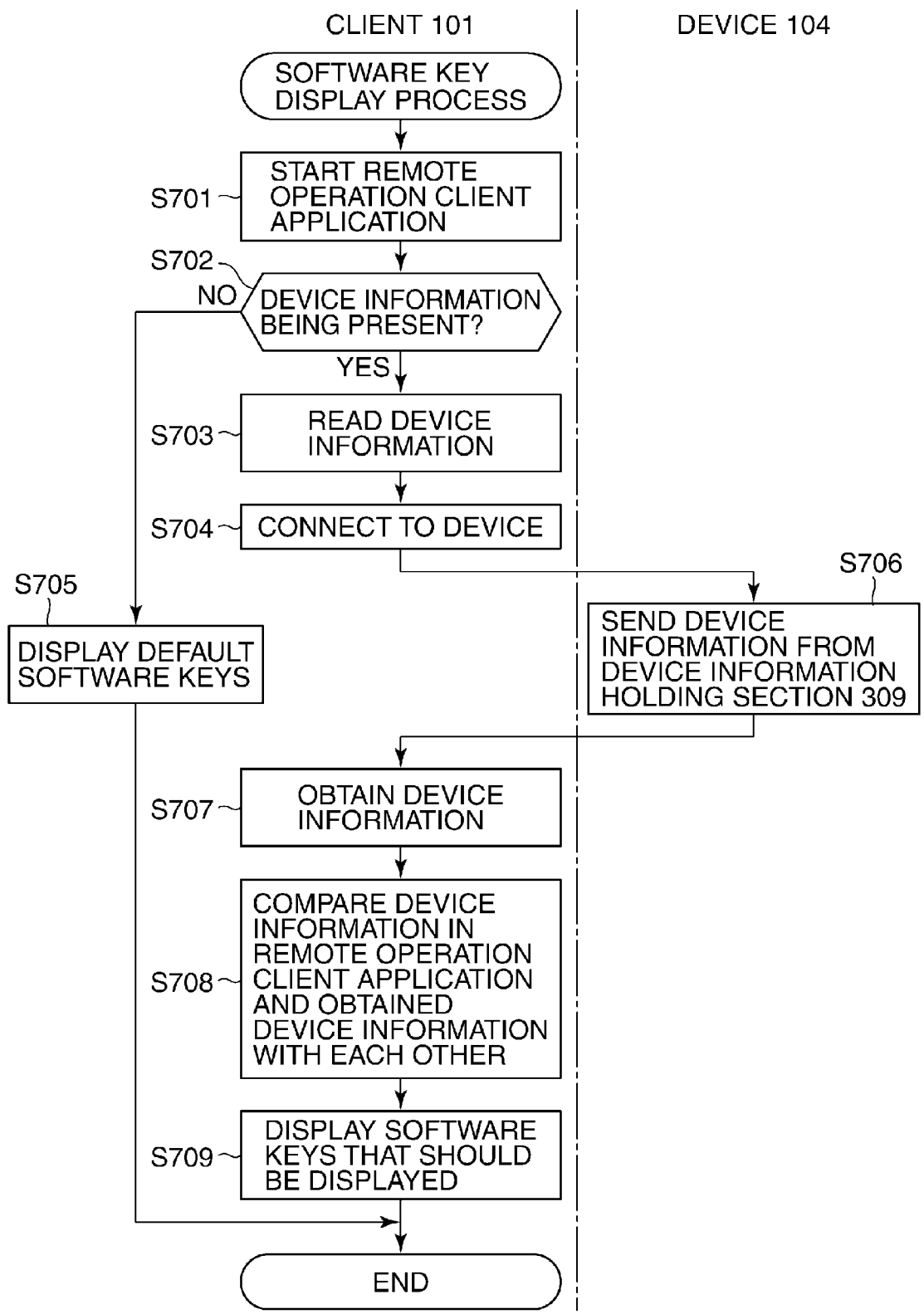

DISPLAYING AN OPERATIONAL SCREEN OF AN IMAGE FORMING APPARATUS ON A DISPLAY SCREEN OF A CLIENT DEVICE IN ORDER TO CONTROL THE IMAGE FORMING APPARATUS FROM THE CLIENT DEVICE

BACKGROUND OF THE INVENTION

1. Field of the Invention

The present invention relates to an information processing apparatus and a control method therefor, as well as a storage medium, and in particular to an information processing apparatus that carries out remote operation and a control method therefor, as well as a storage medium storing a program for implementing the method.

2. Description of the Related Art

There are some conventional techniques that display an image of an operation unit of a device such as an MFP on a display unit of a client such as a PC, which is an information processing apparatus, so as to remotely operate the device (see, for example, Japanese Laid-Open Patent Publication (Kokai) No. 2005-313413).

However, according to the conventional techniques, in order to support a plurality of devices, a client's-side application has to hold UI layout information on all the devices. Therefore, whenever a new device is put on sale, it is necessary to perform maintenance (such as update) on UI layout information in the client's-side application.

SUMMARY OF THE INVENTION

The present invention provides an information processing apparatus and a control method therefor, which are capable of, whenever a new image processing apparatus is put on sale, remotely controlling the image processing apparatus without performing maintenance on the information processing apparatus, as well as a computer-readable storage medium storing a program for implementing the method.

Accordingly, a first aspect of the present invention provides an information processing apparatus that communicates with at least one image processing apparatus having a console including a display section displaying an operation screen and a hardware key, comprising a communication unit configured to communicate with the at least one image processing apparatus, a display unit configured to display a first screen corresponding to the operation screen displayed on the display section of the at least one image processing apparatus and a second screen corresponding to the hardware key which the at least one image processing apparatus has, a holding unit configured to hold at least one image of a hardware key corresponding to the hardware key which the at least one image processing apparatus has, and a display control unit configured to, based on communication information received from an image processing apparatus performing communication via the communication unit, select an image of a hardware key corresponding to a hardware key which the image processing apparatus performing communication has from among the at least one image of the hardware key held in the holding unit, and cause the display unit to display the second screen using the selected image of hardware key.

Accordingly, a second aspect of the present invention provides a control method for an information processing apparatus that communicates with at least one image processing apparatus having a console including a display section displaying an operation screen and a hardware key, and has a display unit that displays an image, comprising a communication step of communicating with the at least one image processing apparatus, and a display control step of causing the display unit to display a first screen corresponding to the operation screen displayed on the display section of the at least one image processing apparatus and a second screen corresponding to the hardware key which the at least one image processing apparatus has, wherein in the display control step, based on communication information received from an image processing apparatus performing communication in the communication step, an image of a hardware key corresponding to a hardware key which the image processing apparatus performing communication has is selected from among at least one image of the hardware key held in advance, and the display unit is caused to display the second screen using the selected image of the hardware key on the display unit.

Accordingly, a third aspect of the present invention provides a non-transitory computer-readable storage medium storing a program for causing a computer to implement a control method for an information processing apparatus that communicates with at least one image processing apparatus having a console including a display section displaying an operation screen and a hardware key, and has a display unit that displays an image, the method comprising a communication step of communicating with the at least one image processing apparatus, and a display control step of causing the display unit to display a first screen corresponding to the operation screen displayed on the display section of the at least one image processing apparatus and a second screen corresponding to the hardware key which the at least one image processing apparatus has, wherein in the display control step, based on communication information received from an image processing apparatus performing communication in the communication step, an image of a hardware key corresponding to a hardware key which the image processing apparatus performing communication has is selected from among at least one image of the hardware key held in advance, and the display unit is caused to display the second screen using the selected image of the hardware key on the display unit.

According to the present invention, whenever a new image processing apparatus is put on sale, the image processing apparatus can be remotely controlled without performing maintenance on the information processing apparatus.

Further features of the present invention will become apparent from the following description of exemplary embodiments (with reference to the attached drawings).

BRIEF DESCRIPTION OF THE DRAWINGS

FIG. 9 is a flowchart showing the procedure of a software key display process carried out by the client and the device appearing in FIG. 1.

DESCRIPTION OF THE EMBODIMENTS

The present invention will now be described in detail with reference to the drawings showing an embodiment thereof.

Figure 1:
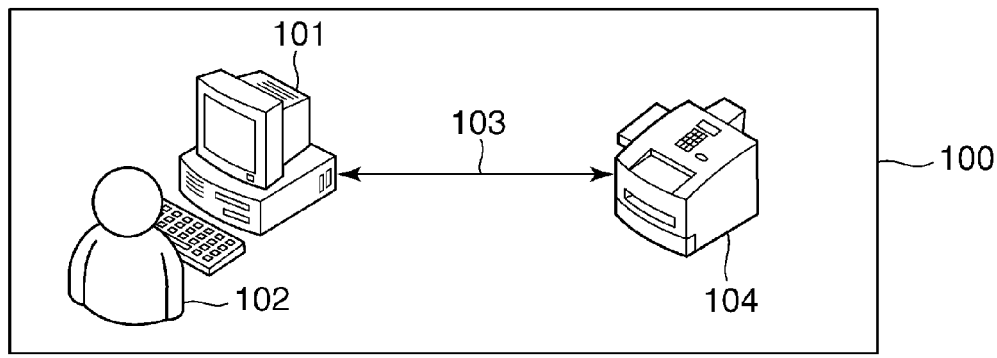
FIG. 1 is a diagram schematically showing an arrangement of a remote operation system including a client according to an embodiment of the present invention.

FIG. 1 is a diagram schematically showing an arrangement of a remote operation system 100 including a client 101 according to an embodiment of the present invention.

An administrator 102 can remotely operate a device 104, which is an image processing apparatus, using the client 101 (information processing apparatus) connected to the device 104 via a network 103.

The client 101 is a PC and has a hardware keyboard and a mouse connected thereto. There is no limitation on forms of hardware such as a key arrangement of the hardware keyboard and the number of clickable buttons of the mouse.

In the present embodiment, even when the mouse is a one or three button mouse, a transition to a private mode screen can be supported by changing key assignments for the device 104 in configuration information on specialized screen transition key operations, to be described later.

Figure 2:
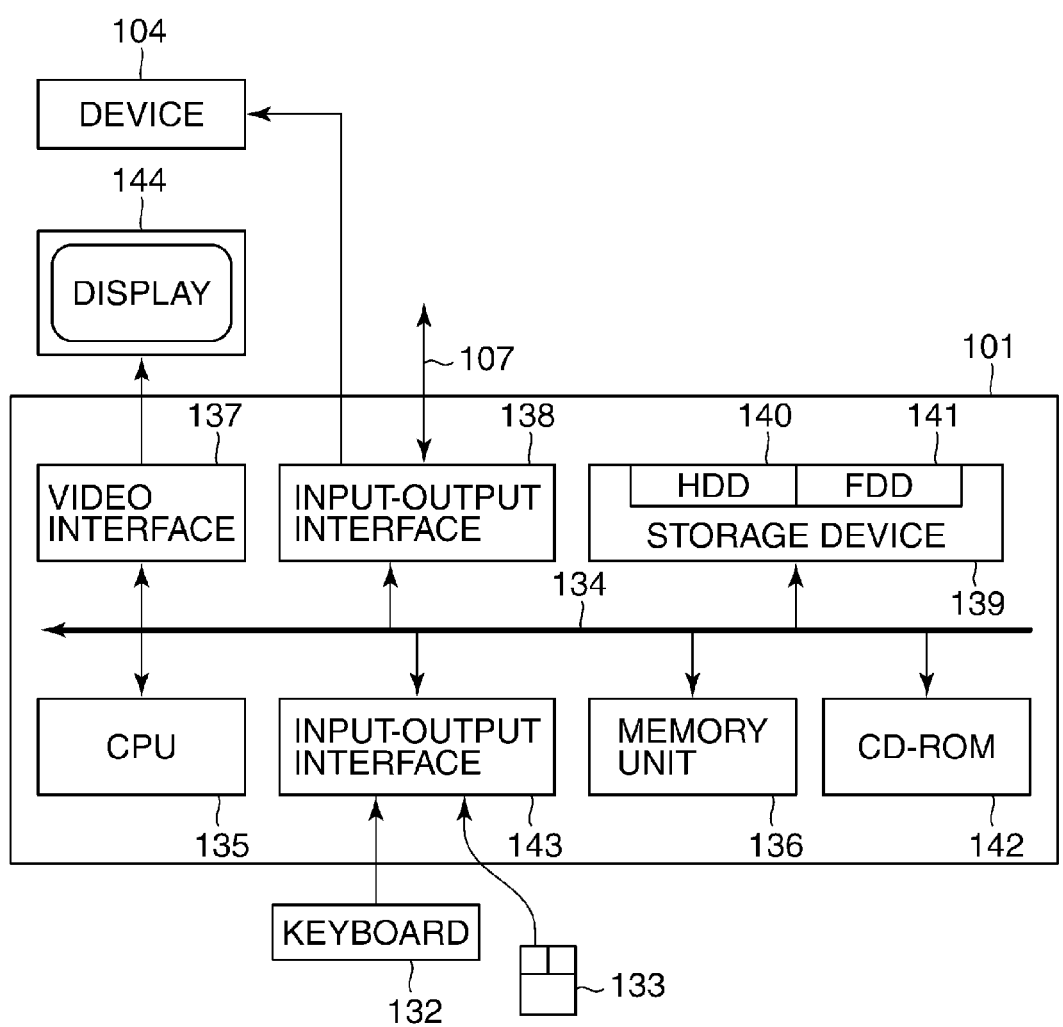
FIG. 2 is a diagram schematically showing an arrangement of the client appearing in FIG. 1.

FIG. 2 is a diagram schematically showing an arrangement of the client 101 appearing in FIG. 1.

The client 101 has input devices such as a keyboard 132 and a pointing device such as a mouse 133, and a display 144 connected thereto. It should be noted that the keyboard 132 is a hardware keyboard. An input-output interface 138 can connect the client 101 to the network 103, thus connecting the client 101 to another computer or the device 104. Typical examples of the network 103 include a local area network (LAN) and a wide area network (WAN).

Thus, the client 101 has the display 144 (display unit) that displays a screen for remotely operating the device 104.

The client 101 has at least one typical CPU 135. The client 101 also has a memory unit 136 comprised of, for example, a semiconductor random access memory (RAM) and a semiconductor read only memory (ROM). Further, the client 101 has a video interface 137 and an input-output interface 143 for the keyboard 132 and the mouse 133.

A storage device 139 has a typical HDD 140 and a typical flexible disk drive 141. A magnetic tape drive or the like may also be used although this is not shown in the figure. A CD-ROM drive 142 is offered as a nonvolatile data source.

The component elements described above carry out communication via an operation system such as Linux or Microsoft Windows (registered trademark) and an interconnection bus 134.

Software that realizes a procedure shown in a flowchart described in the present embodiment is stored in a computer-readable medium including a storage medium such as one described above. The software is loaded from the computer-readable medium into a computer and executed by the CPU 135 of the client 101. By using a computer program product, that computer can act as an apparatus useful for editing document layouts.

Figure 3:
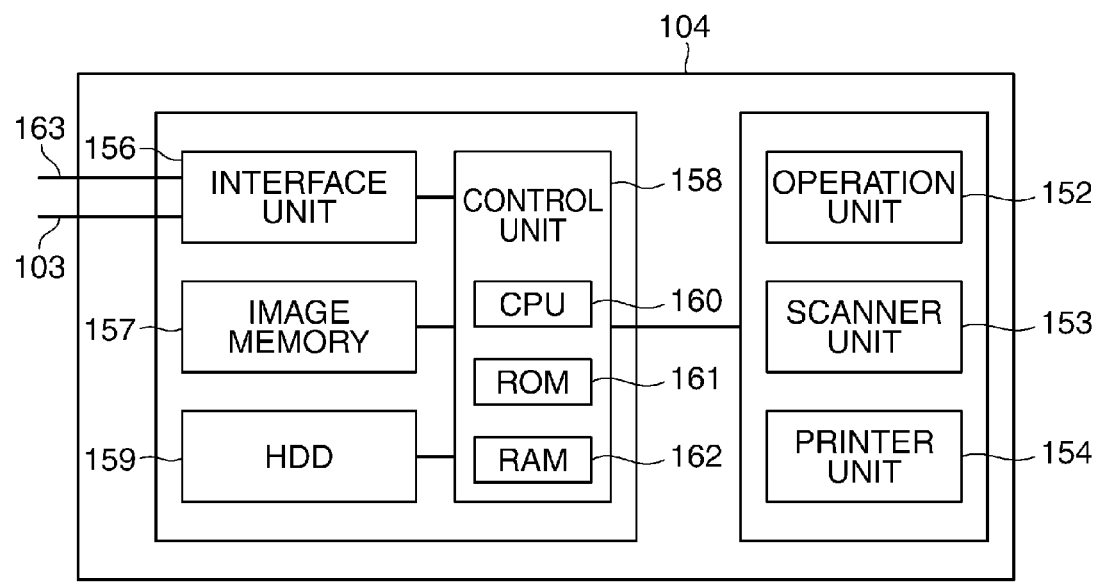
FIG. 3 is a diagram schematically showing an arrangement of a device appearing in FIG. 1.

FIG. 3 is a diagram schematically showing an arrangement of the device 104 appearing in FIG. 1. In the present embodiment, an MFP is taken as an example of the device 104, but the device 104 may be any device other than an MFP.

Referring to FIG. 3, a control unit 158 including a CPU 160 controls the overall operation of the device 104. The CPU 160 reads control programs stored in a ROM 161 and carries out various control processes such as reading control and transmission control.

A RAM 162 is a main memory for the CPU 160 and is used as a temporary storage area such a work area. An HDD 159 stores image data and various programs. The control unit 158 controls the operation of an operation unit 152, a scanner unit 153, and a printer unit 154.

The operation unit 152 is equipped with a liquid crystal display having a touch panel function, various hardware keys (a numeric keypad and operation buttons such as buttons corresponding to respective functions), a keyboard, and so on.

The printer unit 154 prints, on a recording medium, image data to be printed which is input from the control unit 158.

The scanner unit 153 reads an image off an original to generate image data and inputs the image data to the control unit 158.

An interface unit 156 connects the control unit 158 to the network 103 and receives print image data and screen data to be displayed on the operation unit 152 from, for example, an information processing apparatus on the network 103.

The interface unit 156 may also connect to an IC card reader or a memory stick via a USB interface 163 to receive authentication information or image data.

It should be noted that print image received from an information processing apparatus or the like is temporarily stored in an image memory 157 and printed by the printer unit 154 via the control unit 158.

Figure 4:
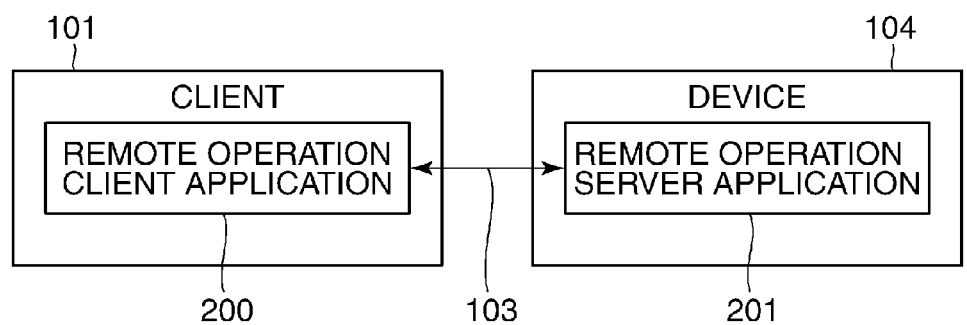
FIG. 4 is a diagram showing software for the device and the client appearing in FIG. 1 to carry out communication with each other.

FIG. 4 is a diagram showing software for the device 104 and the client 101 appearing in FIG. 1 to carry out communication with each other.

Referring to FIG. 4, a remote operation client application 200 of the client 101 connects to a remote operation server application 201 in the device 104 via the network 103, thus enabling two-way communication between them. In the present embodiment, a remote control of the device 104 from the client 101 is realized using VNC (Virtual Network Computing). That is, in the present embodiment, the client 101 operates as a VNC client and is capable of displaying the same screen, on the display 144, with a screen displayed on the display section of the device 104 which operates as a VNC server. Then, the VNC client and the VNC server communicate with each other by complying with the RFB (Remote Frame Buffer) protocol used in VNC. The operation screen displayed on the display 144 of the client 101 as the VNC client is selected by a mouse or the like, coordinate information on a selected part of the operation screen is notified from the client 101 to the device 104 as the VNC server. On receiving the coordinate information, the device 104 operates in the same way as in a case where a part of the operation screen of itself that is specified by the received coordinate information is selected. In addition, each time contents of the operation screen of the device 104 change, the screen information on the changed operation screen is notified to the client 101 as the VNC client. As a result, the same screen as the operation screen which is now displayed on the device 104 is displayed on the display 144 of the client 101. As describe above, in the present embodiment, the remote operation client application 200 which the client 101 has is a VNC client application, and the remote operation server application 201 which the device 104 has is a VNC server application.

Figure 5:
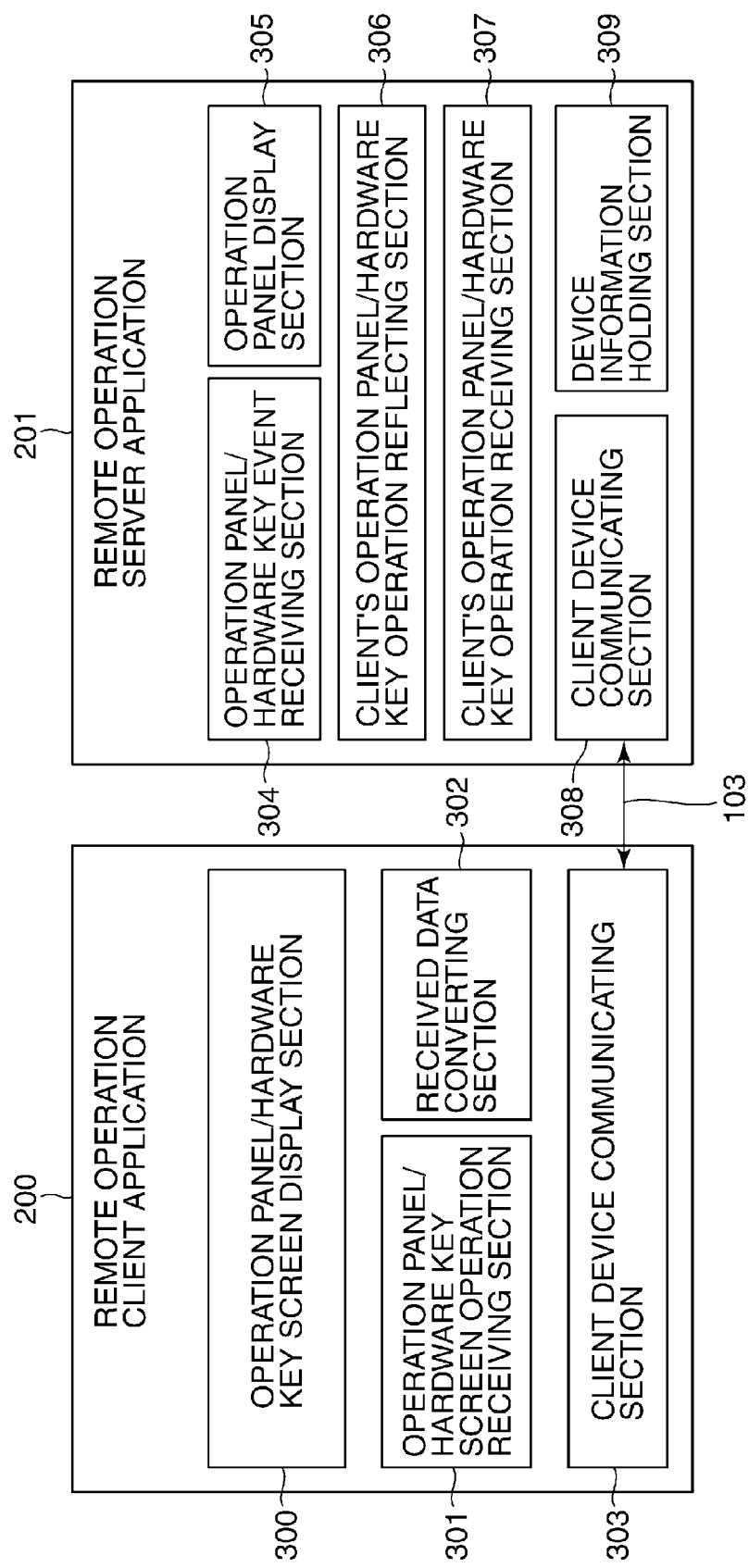
FIG. 5 is a diagram showing in detail arrangements of a remote operation client application and a remote operation server application appearing in FIG. 4.

FIG. 5 is a diagram showing in detail arrangements of the remote operation client application 200 and the remote operation server application 201 appearing in FIG. 4.

Referring to FIG. 5, the remote operation client application 200 is comprised of an operation panel/hardware key screen display section 300, an operation panel/hardware key screen operation receiving section 301, a received data converting section 302, and a client device communicating section 303.

The operation panel/hardware key screen display section 300 is a display section for a user to perform operation from the client 101.

Figure 6:
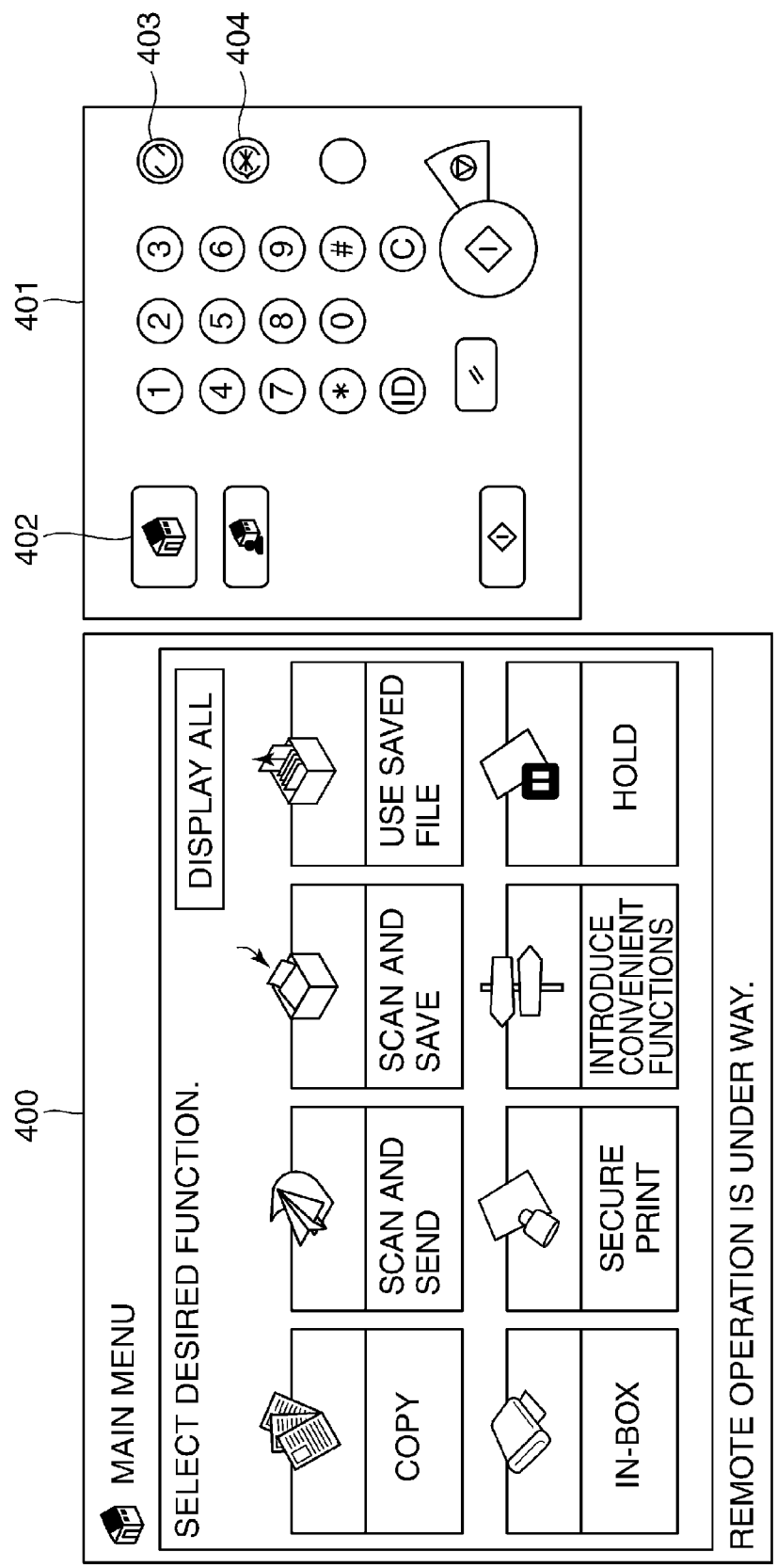
FIG. 6 is a view showing screens displayed by an operation panel/hardware key screen display section.

FIG. 6 is a view showing screens displayed by the operation panel/hardware key screen display section 300.

Referring to FIG. 6, the screens consist of two screens, i.e. an operation panel screen 400 and a software keypad 401. The operation panel screen 400 is a screen displayed on the liquid crystal display of the operation unit 152 of the device 104, and the software keypad 401 corresponds to the hardware keys provided on the operation unit 152 of the device 104. Both the operation panel screen 400 and the software keypad 401 are screens displayed on the display 144 of the client 101. In the software keypad 401, a main menu 402 is displayed correspondingly to the operation panel screen 400. Further, in the software keypad 401, a power saving button 403 and a custom button 404 are displayed.

Referring again to FIG. 5, the operation panel/hardware key screen operation receiving section 301 holds information received from the input terminals such as the mouse 133 and the keyboard 132 for the operation panel screen 400 and the software keypad 401.

The received data converting section 302 converts information received by the operation panel/hardware key screen operation receiving section 301 into a data structure for transmission to the remote operation server application 201.

The client device communicating section 303 transmits data obtained through the conversion by the received data converting section 302, and also receives information from the remote operation server application 201.

The remote operation server application 201 is comprised of an operation panel/hardware key event receiving section 304, an operation panel display section 305, and a client's operation panel/hardware key operation reflecting section 306.

Further, the remote operation server application 201 is comprised of a client's operation panel/hardware key operation receiving section 307, a client device communicating section 308, and a device information holding section 309. The device information holding section 309 holds operation screen-related information on operation screens displayed on the device 104 and operation buttons which the operation unit of the device 104 has.

The operation panel/hardware key event receiving section 304 receives information input from the operation panel display section 305 and hardware keys mounted on the device 104.

The client's operation panel/hardware key operation reflecting section 306 performs processing using data received by the client's operation panel/hardware key operation receiving section 307.

Specifically, the client's operation panel/hardware key operation reflecting section 306 performs the same processing as in a state where input is done through the operation panel display section 305 and the hardware keys mounted on the device 104.

For example, when a button numbered 1 is depressed in the software keypad 401, the same processing is performed as in a state where a hardware key numbered 1 in the device 104 is input.

The client device communicating section 308 carries out two-way communication with the client device communicating section 303 of the remote operation client application 200.

The client device communicating section 308 transmits information on the device information holding section 309 to the client 101. Further, the client device communicating section 308 receives, from the client device communicating section 303, data obtained by the received data converting section 302 converting information input via the operation panel screen 400 and the software keypad 401.

Figure 7:
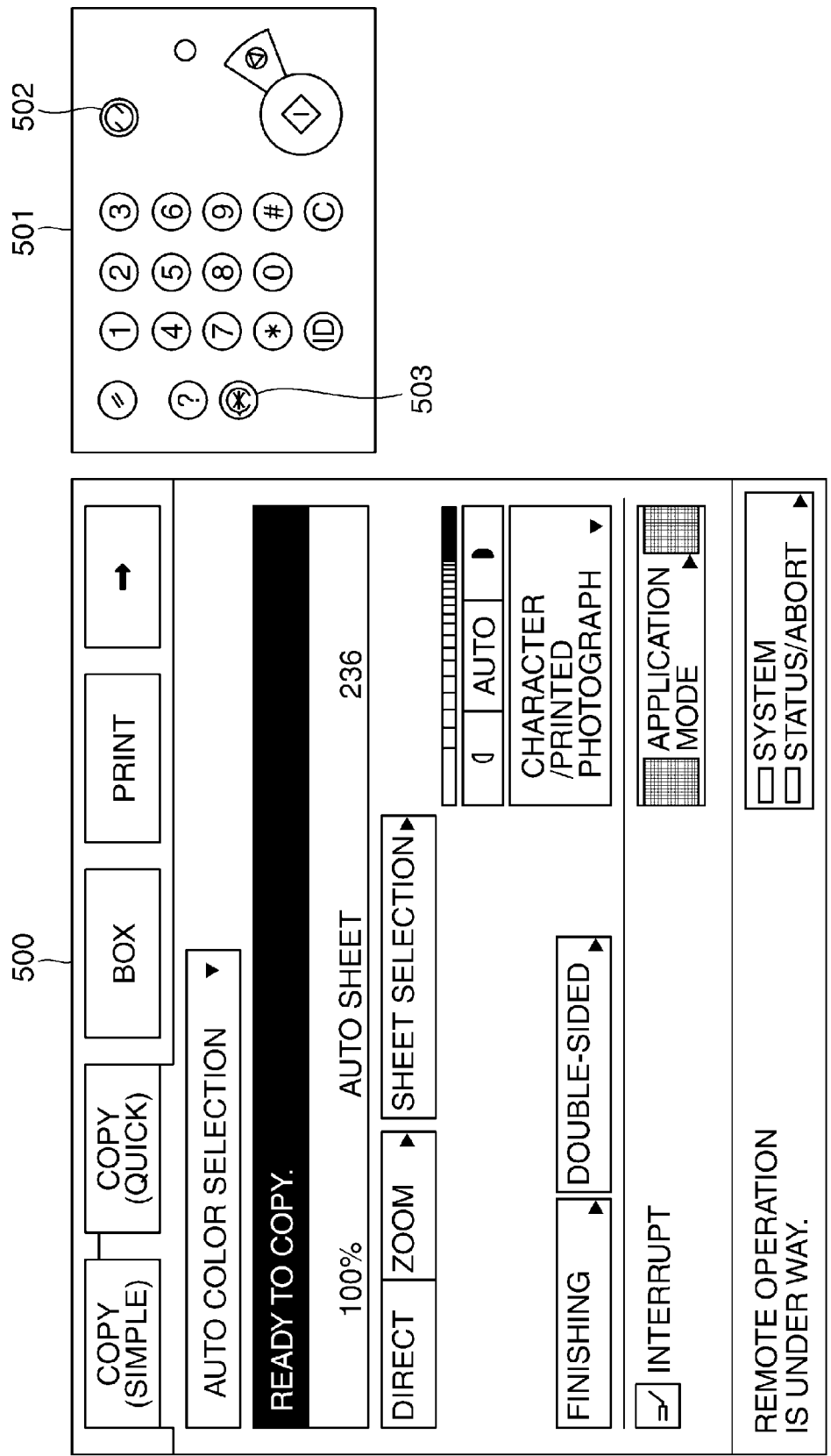
FIG. 7 is a view showing exemplary software keys.

FIG. 7 is a view showing an exemplary screen for remotely operating the device 104, which is displayed on the display of the client 101.

Referring to FIG. 7, an operation panel 500 is a screen displayed on the liquid crystal display of the operation unit 152 of the device 104. This screen uses an 8-bit color mode. In this case, based on information obtained from the device information holding section 309, it is determined that the screen uses an 8-bit color mode. Thus, a software keypad 501 displayed on the client 101 has a different screen layout from the software keypad 401 shown in FIG. 6. A power-saving button 502 and a custom button 503 are displayed in the software keypad 501.

Figure 8:
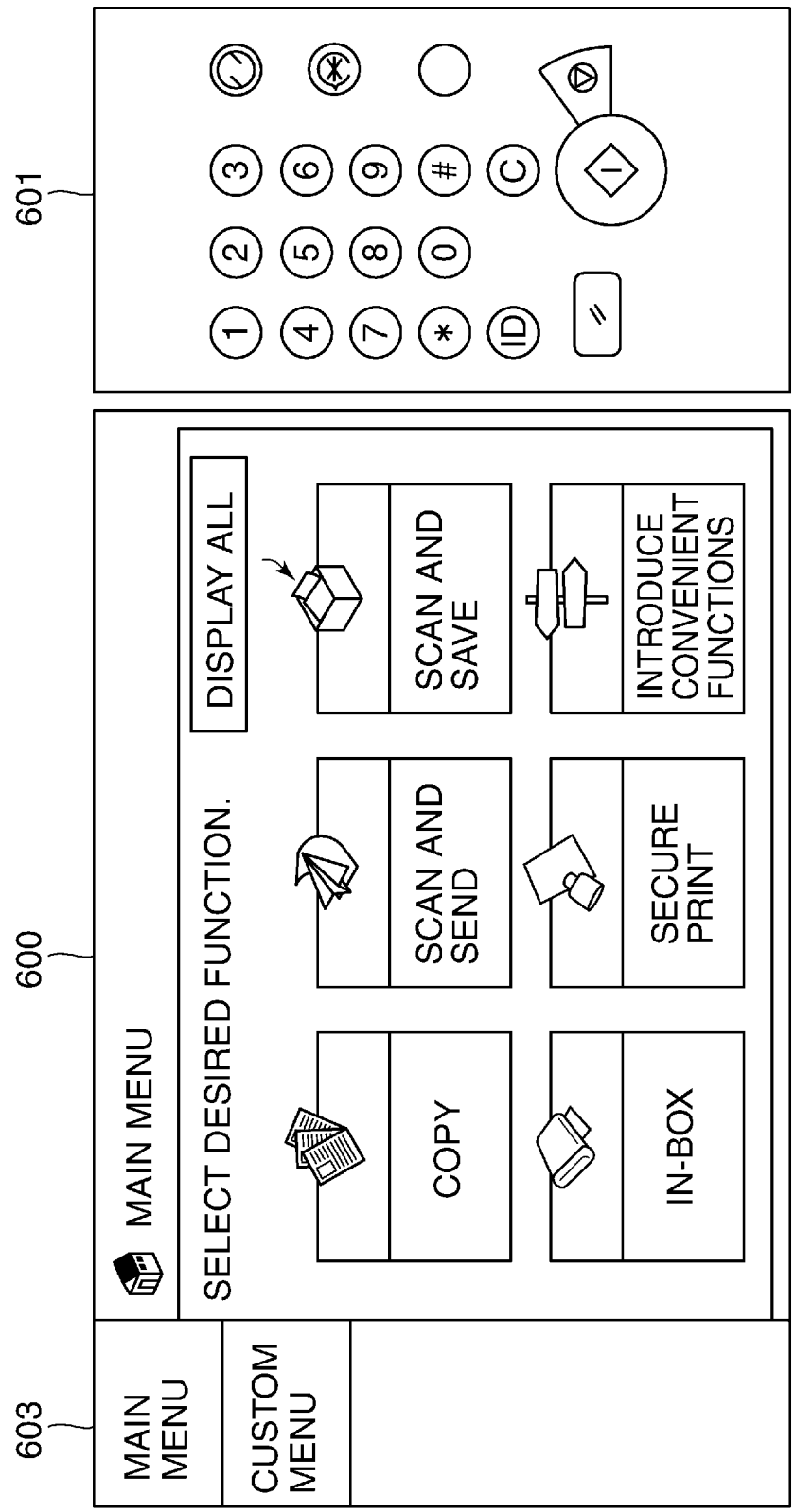
FIG. 8 is a view showing other exemplary software keys.

FIG. 8 is a view showing another exemplary screens for remotely operating the device 104, which are displayed on the display of the client 101.

Referring to FIG. 8, an operation panel 600 is a screen displayed on the liquid crystal display of the operation unit 152 of the device 104. A main menu button 603 on this screen is included in the operation panel 600.

In this case, according to information obtained from the device information holding section 309, there is no main menu as key data that can be received, and hence as is distinct from the software keypad 401, a software keypad 601 has a screen layout in which there is no button corresponding to a main menu button.

Thus, based on information obtained from the device information holding section 309 of the remote operation server application 201, layouts can be dynamically changed like the software key pads 401, 501, and 601.

The remote operation client application 200 determines what kind of keypad such as the software keypad 401, 501, or 601 is to be displayed based on what kind of device information by using the data below stored in advance in, for example, the HDD 140.

The software keypad 401 is displayed when device information indicates "there is a menu button, RGB32".

The software keypad 501 is displayed when device information indicates "there is no menu button, RGB8".

The software keypad 601 is displayed when device information indicates "there is no main menu, custom button, and power saving button, RGB32".

Namely, the above data and device information from the device 104 are compared with each other to determine a screen to be displayed on the client 101. Thus, the client 101 has a holding unit (HDD 140) in which operation screen images corresponding to respective operation screens displayed on different types of devices 104 and button images corresponding to operation buttons which operation units of the devices 104 have are stored in advance. Operation screen-related information indicative of an operation screen is, for example, "RGB32", and operation screen-related information indicative of an operation button which an operation unit has is, for example, "a power-saving button".

For the reasons stated above, even different types of devices can be supported merely by holding a small amount of data as above in the remote operation client application 200 by combining information on the presence or absence of available buttons in remote operation and color modes.

FIG. 9 is a flowchart showing the procedure of a software key display process carried out by the client 101 and the device 104 appearing in FIG. 1.

This software key display process is carried out by a CPU 135 of the client 101 and the CPU 160 of the device 104.

Referring to FIG. 9, the CPU 135 starts the remote operation client application 200 stored in the HDD 140 (step S701). The CPU 135 then determines whether or not there is device information in the HDD 140 (step S702).

When, as a result of the determination in the step S702, there is no device information (NO in the step S702), the CPU 135 displays default software keys prepared in advance (step S705) and terminates the present process.

On the other hand, there is device information (YES in the step S702), the CPU 135 reads device information from the HDD 140 (step S703).

Then, the CPU 135 connects to the device 104 (step S704). The CPU 160 of the device 104 transmits device information to the client 101 from the device information holding section 309 in the HDD 159 (step S706).

The CPU 135 obtains the transmitted device information (step S707). The CPU 135 then compares the device information read in the step S703 and the device information obtained in the step S707 with each other (step S708).

As a result of this comparison, the layout of keys to be displayed is determined, and hence control is performed so that software keys to be displayed can be displayed on the display 144 (step S709), and the present process is brought to an end.

Referring to FIG. 9, button images corresponding to operation buttons indicated in obtained operation screen-related information and an operation screen image corresponding to the operation screen are read from the HDD 140, and the display 144 is controlled to display the read button images and operation screen image. As a result, an information processing apparatus that remotely operates image processing apparatuses can display a remote operation screen without the need to have remote operation screens for the respective image processing apparatuses.

Moreover, the remote operation client application 200 has no need to hold UI layout information with respect to each device. As a result, whenever a new device is put on sale, there is no need to perform maintenance of UI layout information in a client's-side application. Therefore, the effect of enhancing the ease of maintenance and versatility can also be obtained. It should be noted that device information which the client 101 receives from the device 104 is not limited to the above examples, but may be information with which the software key to be displayed on the client 101, that is, the software key corresponding to the hardware key of the operation unit of the device 104 can be selected. For example, the device information may be identification information for identifying the device 104 such as a device ID and an apparatus name. Moreover, the image processing apparatus according to the present embodiment includes not only a device such as an MFP but also any display apparatus having a display unit. For example, the image processing apparatus includes information processing apparatuses such as a personal computer and a mobile information terminal.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-180413 filed Aug. 22, 2011, which is hereby incorporated by reference herein in its entirety.

What is claimed is:

1. An information processing apparatus capable of communicating with a first image processing apparatus and a second image processing apparatus that have a console including a display section displaying an operation screen and a hardware key, the information processing apparatus comprising:

a communication interface configured to communicate with the first image processing apparatus or the second image processing apparatus; and a display that displays, when the communication interface communicates with the first image processing apparatus, a first screen corresponding to the operation screen displayed on the display section of the first image processing apparatus and a second screen corresponding to the hardware key of the first image processing apparatus, and displays, when the communication interface communicates with the second image processing apparatus, a third screen corresponding to the operation screen displayed on the display section of the second image processing apparatus and a fourth screen corresponding to the hardware key of the second image processing apparatus;

a processor; and a memory storing instructions which, when executed by the processor, cause the information processing apparatus to:

hold a first button image corresponding to a first operation button which is included in the hardware key of the first image processing apparatus and the hardware key of the second image processing apparatus, and a second button image corresponding to a second operation button which is included in the hardware key of the first image processing apparatus and is not included in the hardware key of the second image processing apparatus;

select, based on device information received from the first image processing apparatus, the first button image and the second button image as button images to be displayed on the second screen from among a plurality of button images, and select, based on device information received from the second image processing apparatus, the first button image as a button image to be displayed on the fourth screen;

cause the display to display, when the communication interface communicates with the first image processing apparatus, the second screen including the selected first button image and the selected second button image, and cause the display to display, when the communication interface communicates with the second image processing apparatus, the fourth screen including the selected first button image; and notify coordinate information on the first screen corresponding to an operation on the first screen displayed on the display to the first image processing apparatus, and, based on the coordinate information, cause the first image processing apparatus to operate assuming that the same operation as the operation on the first screen is carried out on the operation screen displayed on the display section of the first image processing apparatus; and wherein the device information includes information on the number of colors used by the operation screen displayed on the display section of the first image processing apparatus or the second image processing apparatus.

2. The information processing apparatus according to claim 1, wherein the device information includes information for identifying the operation screen displayed on the display section of the first image processing apparatus or the second image processing apparatus and the hardware key of the first image processing apparatus or the second image processing apparatus.

3. The information processing apparatus according to claim 1, wherein the device information includes information indicative of a type of the hardware key of the first image processing apparatus or the second image processing apparatus.

4. The information processing apparatus according to claim 1, wherein the instructions further cause the information processing apparatus to cause the display to display the second screen in a layout corresponding to a layout of the hardware key of the first image processing apparatus using the first button image and the second button image selected based on the device information.

5. The information processing apparatus according to claim 1, wherein the hardware key includes a numerical keypad.

6. The information processing apparatus according to claim 1, wherein the communication interface carries out communication via a network.

7. The information processing apparatus according to claim 1, wherein the first screen has the same layout as that of the operation screen displayed on the display section of the first image processing apparatus.

8. The information processing apparatus according to claim 1, wherein the instructions further cause the information processing apparatus to cause the first image processing apparatus to operate, in accordance with an operation on the second screen displayed on the display, assuming that the same operation as the operation on the second screen is carried out on the hardware key of the first image processing apparatus.

9. The information processing apparatus according to claim 1, wherein the instructions further cause the information processing apparatus to notify coordinate information on the third screen corresponding to an operation on the third screen displayed on the display to the second image processing apparatus, and based on the coordinate information, cause the second image processing apparatus to operate assuming that the same operation as the operation on the third screen is carried out on the operation screen displayed on the display section of the second image processing apparatus.

10. The information processing apparatus according to claim 1, wherein the communication interface carries out communication using VNC (Virtual Network Computing).

11. The information processing apparatus according to claim 1, wherein the first image processing apparatus and the second image processing apparatus include any one of a device, a personal computer, and a mobile terminal.

12. A control method for an information processing apparatus capable of communicating with a first image processing apparatus and a second image processing apparatus that have a console including a display section displaying an operation screen and a hardware key, and have a display unit that displays an image, the control method comprising:

communicating with the first image processing apparatus or the second image processing apparatus;

causing the display unit to display, when communicating with the first image processing apparatus, a first screen corresponding to the operation screen displayed on the display section of the first image processing apparatus and a second screen corresponding to the hardware key of the first image processing apparatus, and display, when communicating with the second image processing apparatus, a third screen corresponding to the operation screen displayed on the display section of the second image processing apparatus and a fourth screen corresponding to the hardware key of the second image processing apparatus;

holding a first button image corresponding to a first operation button which is included in the hardware key of the first image processing apparatus and the hardware key of the second image processing apparatus, and a second button image corresponding to a second operation button which is included in the hardware key of the first image processing apparatus and is not included in the hardware key of the second image processing apparatus;

selecting, based on device information received from the first image processing apparatus, the first button image and the second button image as button images to be displayed on the second screen from among a plurality of held button images;

selecting, based on device information received from the second image processing apparatus, the first button image as a button image to be displayed on the fourth screen;

displaying, when communicating with the first image processing apparatus, the second screen including the selected first button image and the selected second button image;

displaying, when communicating with the second image processing apparatus, the fourth screen including the selected first button image;

notifying coordinate information on the first screen corresponding to an operation on the first screen displayed on the display unit to the first image processing apparatus; and causing, based on the coordinate information, the first image processing apparatus to operate assuming that the same operation as the operation on the first screen is carried out on the operation screen displayed on the display section of the first image processing apparatus, wherein the device information includes information on the number of colors used by the operation screen displayed on the display section of the first image processing apparatus or the second image processing apparatus.

13. A non-transitory computer-readable storage medium storing a program for causing a computer to implement a control method for an information processing apparatus capable of communicating with a first image processing apparatus and a second image processing apparatus that have a console including a display section displaying an operation screen and a hardware key, and have a display unit that displays an image, the control method comprising:

communicating with the first image processing apparatus or the second image processing apparatus;

causing the display unit to display, when communicating with the first image processing apparatus, a first screen corresponding to the operation screen displayed on the display section of the first image processing apparatus and a second screen corresponding to the hardware key of the first image processing apparatus, and display, when communicating with the second image processing apparatus, a third screen corresponding to the operation screen displayed on the display section of the second image processing apparatus and a fourth screen corresponding to the hardware key of the second image processing apparatus;

holding a first button image corresponding to a first operation button which is included in the hardware key of the first image processing apparatus and the hardware key of the second image processing apparatus, and a second button image corresponding to a second operation button which is included in the hardware key of the first image processing apparatus and is not included in the hardware key of the second image processing apparatus;

selecting, based on device information received from the first image processing apparatus, the first button image and the second button image as button images to be displayed on the second screen from among a plurality of held button images;

selecting, based on device information received from the second image processing apparatus, the first button image as a button image to be displayed on the fourth screen;

displaying, when communicating with the first image processing apparatus, the second screen including the selected first button image and the selected second button image;

displaying, when communicating with the second image processing apparatus, the fourth screen including the selected first button image;

notifying coordinate information on the first screen corresponding to an operation on the first screen displayed on the display unit to the first image processing apparatus; and causing, based on the coordinate information, the first image processing apparatus to operate assuming that the same operation as the operation on the first screen is carried out on the operation screen displayed on the display section of the first image processing apparatus, wherein the device information includes information on the number of colors used by the operation screen displayed on the display section of the first image processing apparatus or the second image processing apparatus.

* * * * *